United States Patent
Vukovic et al.

(10) Patent No.: US 9,864,463 B2
(45) Date of Patent: Jan. 9, 2018

(54) TOUCH PANEL DEFORMATION COMPENSATION

(71) Applicants: Predrag Vukovic, Eastleigh (GB); Martin John Simmons, Southhampton (GB); Darren Golbourn, Southampton (GB); Andrew Hersee, Hampshire (GB)

(72) Inventors: Predrag Vukovic, Eastleigh (GB); Martin John Simmons, Southhampton (GB); Darren Golbourn, Southampton (GB); Andrew Hersee, Hampshire (GB)

(73) Assignee: Atmel Corporation, San Jose, CA (US)

( * ) Notice: Subject to any disclaimer, the term of this patent is extended or adjusted under 35 U.S.C. 154(b) by 203 days.

(21) Appl. No.: 13/786,124

(22) Filed: Mar. 5, 2013

(65) Prior Publication Data
US 2014/0253488 A1    Sep. 11, 2014

(51) Int. Cl.
*G06F 3/045*    (2006.01)
*G06F 3/041*    (2006.01)

(52) U.S. Cl.
CPC .......... *G06F 3/0418* (2013.01); *G06F 3/0416* (2013.01); *G06F 3/045* (2013.01)

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2006/0244733 A1* | 11/2006 | Geaghan | 345/173 |
| 2009/0315854 A1 | 12/2009 | Matsuo | |
| 2010/0244859 A1* | 9/2010 | Cormier et al. | 324/678 |
| 2011/0234508 A1* | 9/2011 | Oda | G06F 3/044 345/173 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Jennifer Mehmood
*Assistant Examiner* — Stephen T Reed
(74) *Attorney, Agent, or Firm* — Baker Botts L.L.P.

(57) ABSTRACT

In one embodiment, a method includes receiving, from a touch sensor of a device, one or more signals corresponding to touch or proximity inputs within a touch-sensitive area of the touch sensor. The touch sensor comprising one or more nodes. The method also includes applying an offset to one or more of the signals. The offset corresponding to a variation in a distance between a touch panel and a ground plane or display of the device. The method also includes determining whether a touch input to the touch sensor has occurred based at least in part on the signals and the offset as applied.

20 Claims, 4 Drawing Sheets

(56) References Cited

U.S. PATENT DOCUMENTS

| | | |
|---|---|---|
| 2012/0013564 A1* | 1/2012 | Westhues et al. ............ 345/174 |
| 2012/0098783 A1* | 4/2012 | Badaye ................. G06F 3/044 345/174 |
| 2012/0162094 A1* | 6/2012 | Kent et al. ................... 345/173 |
| 2012/0194452 A1* | 8/2012 | Cho et al. ..................... 345/173 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0050151 A1* | 2/2013 | Tu et al. ...................... 345/178 |
| 2013/0265258 A1* | 10/2013 | Garfinkel et al. ............ 345/173 |

* cited by examiner

TOUCH PANEL DEFORMATION COMPENSATION

TECHNICAL FIELD

This disclosure generally relates to touch signal processing.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the touch sensor, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
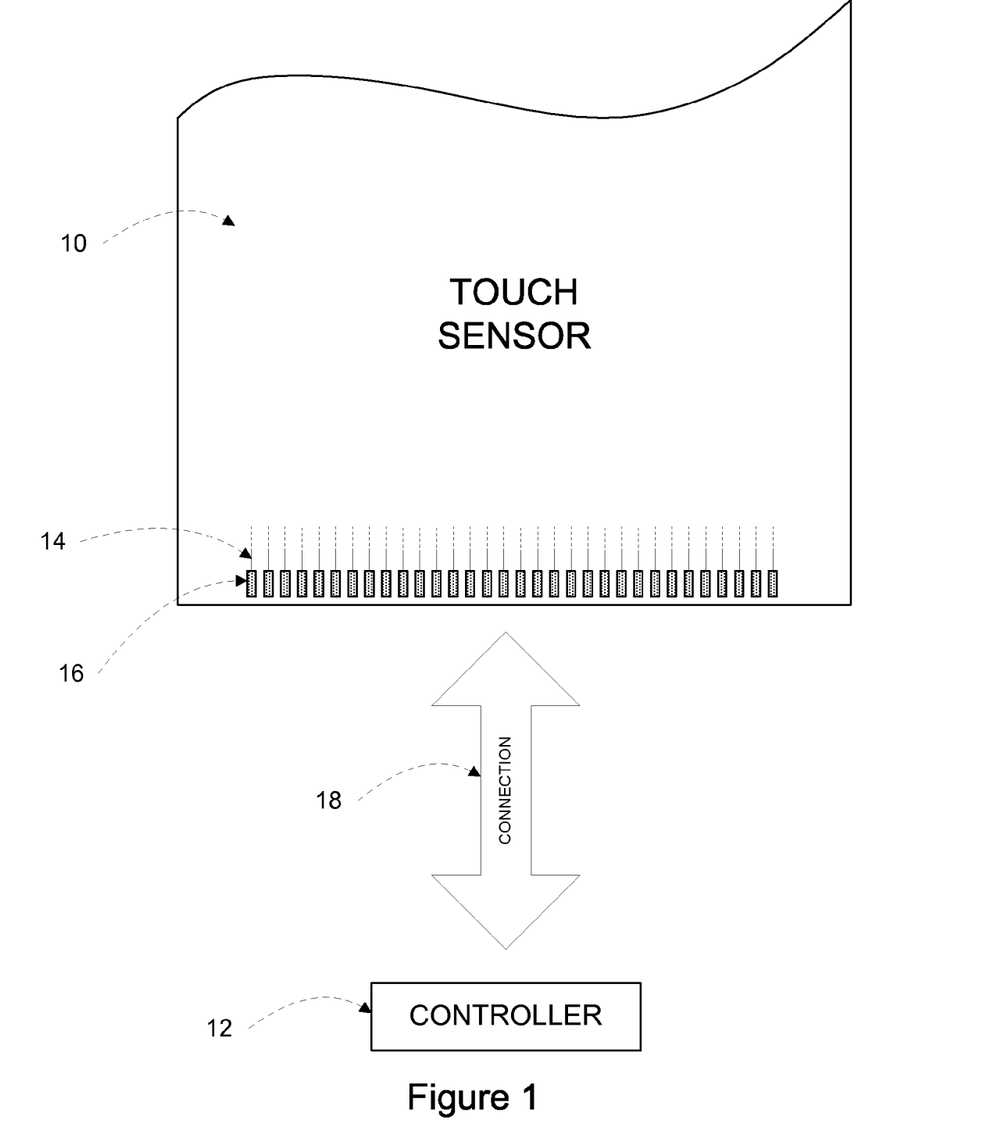
FIG. 1 illustrates an example array of touch sensors with an example touch-sensor controller.

FIG. 1 illustrates an example touch sensor array with an example touch-sensor controller. Touch sensor array 10 and touch-sensor controller 12 may detect the presence and location of a touch or the proximity of an object within a touch-sensitive area of touch sensor array 10. Herein, reference to a touch sensor array may encompass both the touch sensor and its touch-sensor controller, where appropriate. Similarly, reference to a touch-sensor controller may encompass both the touch-sensor controller and its touch sensor array, where appropriate. Touch sensor array 10 may include one or more touch-sensitive areas, where appropriate. Touch sensor array 10 may include an array of electrodes disposed on one or more substrates, which may be made of a dielectric material. Herein, reference to a touch sensor array may encompass both the electrodes of the touch sensor and the substrate(s) that they are disposed on, where appropriate. Alternatively, where appropriate, reference to a touch sensor array may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor array 10 may constitute in whole or in part one or more macro-features of the touch sensor array 10. One or more characteristics of the implementation of those shapes (such as, for example, the conductive materials, fills, or patterns within the shapes) may constitute in whole or in part one or more micro-features of the touch sensor array 10. One or more macro-features of a touch sensor array 10 may determine one or more characteristics of its functionality, and one or more micro-features of the touch sensor array 10 may determine one or more optical features of the touch sensor, such as transmittance, refraction, or reflection.

A mechanical stack may contain the substrate (or multiple substrates) and the conductive material forming the electrodes of touch sensor array 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor array 10 may be made of polyethylene terephthalate (PET) or another suitable material. This disclosure contemplates any suitable substrate with any suitable portions made of any suitable material. In particular embodiments, the electrodes in touch sensor array 10 may be made of ITO in whole or in part. In particular embodiments, the electrodes in touch sensor array 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor array 10 may implement a capacitive form of touch sensing. In a self-capacitance implementation, touch sensor array 10 may include an array of electrodes that may each form a capacitive node. A pulsed or alternating voltage applied to the electrode (by touch-sensor controller 12) may induce a charge on the electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array 10, touch-sensor controller 12 may determine the position of the touch or proximity within the touch-sensitive area(s) of touch sensor array 10. This disclosure contemplates any suitable form of capacitive touch sensing, where appropriate.

For a self-capacitance implementation, electrodes may be disposed in a pattern on a single substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor array 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor array 10 and touch-sensor controller 12, which may respond to the touch or proximity input by initiating a function of the device (or an application running on the device). Although this disclosure describes a particular touch-sensor controller having particular functionality with respect to a particular device and a particular touch sensor array, this disclosure contemplates any suitable touch-sensor controller having any suitable functionality with respect to any suitable device and any suitable touch sensor array.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor array 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the electrodes of touch sensor array 10. The sense unit may sense charge at the capacitive nodes of touch sensor array 10 and provide measurement signals to the processor unit representing capacitances at the capacitive nodes. The processor unit may control the supply of drive signals to the electrodes by the drive unit and process measurement signals from the sense unit to detect and process the presence and location of a touch or proximity input within the touch-sensitive area(s) of touch sensor array 10. The processor unit may also track changes in the position of a touch or proximity input within the touch-sensitive area(s) of touch sensor array 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor array 10 may couple the electrodes of touch sensor 10 to connection pads 16, also disposed on the substrate of touch sensor array 10. As described below, connection pads 16 facilitate coupling of tracks 14 to touch-sensor controller 12. Tracks 14 may extend into or around (e.g. at the edges of) the touch-sensitive area(s) of touch sensor array 10. Particular tracks 14 may provide drive connections for coupling touch-sensor controller 12 to electrodes of touch sensor array 10, through which the drive unit of touch-sensor controller 12 may supply drive signals to the electrodes. Other tracks 14 may provide sense connections for coupling touch-sensor controller 12 to electrodes of touch sensor 10, through which the sense unit of touch-sensor controller 12 may sense charge at the capacitive nodes of touch sensor array 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor array 10 may include one or more ground lines terminating at a ground connector (which may be a connection pad 16) at an edge of the substrate of touch sensor array 10 (similar to tracks 14).

Connection pads 16 may be located along one or more edges of the substrate, outside the touch-sensitive area(s) of touch sensor array 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the electrodes of touch sensor array 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
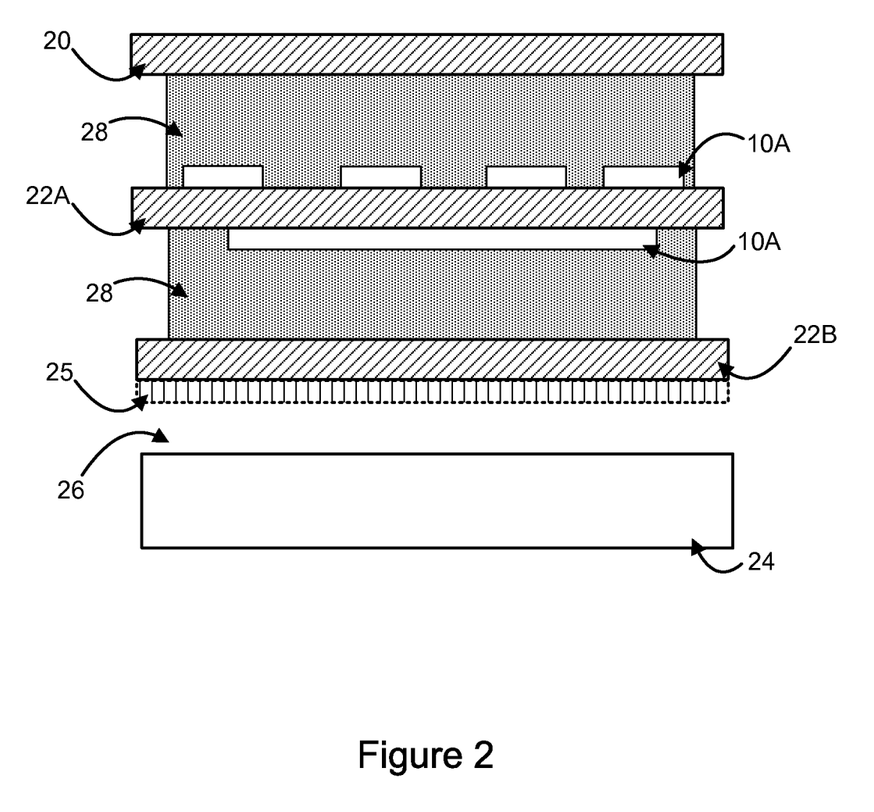
FIG. 2 illustrate an example cross sectional view of an example touch sensor and display.

FIG. 2 illustrates an example cross sectional view of an example touch sensor stack. Although this disclosure illustrates and describes a particular configuration of particular layers forming a particular touch-sensor stack, this disclosure contemplates any suitable configuration of any suitable layers forming any suitable touch-sensor stack. In particular embodiments, electrodes 10A may be disposed on one or more substrate layers 22A-B. In the example of FIG. 2, electrodes 10A are disposed on opposing surfaces of substrate layer 22A. As described above, substrate layers 22A-B may be a substantially transparent layer such as PET or polycarbonate, or potentially a glass layer. In particular embodiments, substantially transparent adhesive layers 28 may be used to bond substrate layer 22A to substantially transparent touch panel 20 and substrate layer 22A to substrate layer 22B. As an example and not by way of limitation, adhesive layer 28 may be a liquid adhesive, or an adhesive sheet. In particular embodiments, a dielectric layer 26 may be positioned between a display 24 and substrate layer 22B. As an example and not by way of limitation, dielectric layer 26 may be an airgap or another adhesive layer. In particular embodiments, a ground plane 25 of the touch sensor may be positioned between substrate layer 22B and dielectric layer 26, as appropriate. Although this disclosure illustrates and describes a particular touch-sensor stack with a particular ground plane, this disclosure contemplates any suitable touch-sensor stack that may or may not include a ground plane.

In particular embodiments, a distance between touch panel 20 and other device components, such as for example display 24 or ground plane 25 of the touch sensor, may vary during use. As an example and not by way of limitation, the variation of distance over the expanse of touch panel 20 may occur due to deformation of touch panel 20 during a touch input on touch panel 20. The variation of distance may cause one or more localized variations in the signal measured by electrodes 10A of the touch sensor. As an example and not by way of limitation, the variation of distance may result in an offset in an amount of charge or the voltage measured by one or more capacitive nodes of the touch sensor. The localized variation in the signal may result in false detection of a touch input, failure to detect a touch input, or inaccurate location determination of the touch input if the variation is not compensated. Touch panel 20 deformation compensation may provide compensation for other effects, such as for example liquid-crystal-display (LCD) noise, thermal drift, or aging effects of the touch sensor. LCD noise may disrupt touch detection by the touch sensor. As an example and not by way of limitation, when operating, the LCD 24 may generate electric signals that affect the drive unit of the touch sensor. The touch-panel-deformation compensation may substantially offset LCD noise generated by display 24. As another example, operation of components of the touch sensor may generate heat that affects electric signals traveling throughout the touch sensor (e.g. in the drive units). As another example, performance of the touch sensor may degrade due to repeated, physical pressure applied to the touch sensor or degradation of materials used in the manufacturing of the touch sensor. As a result of the above effects, the touch sensor may detect a false touch input or fail to detect a touch input.

In particular embodiments, a deformation in touch panel 20 may be detected by searching for a gradual background curvature in the measured amounts of charge or the voltages without a touch input as a function of the position within the touch sensor. In particular embodiments, an offset due to deformation of touch panel 20 may be determined by fitting a function corresponding to a curve or a two-dimensional (2D) surface to the output signals from the touch sensor. As an example and not by way of limitation, a curvature of touch panel 20 may be inferred based at least in part on a localized voltage differential between the capacitive nodes neighboring one or more capacitive nodes of the touch sensor. For example, capacitive nodes with an output voltage variation with a relatively small gradient from the neighboring capacitive nodes may be attributed at in part to bending of touch panel 20. As another example, capacitive nodes with an output voltage variation with a relatively large gradient from the neighboring capacitive nodes may be attributed at in part to touch input detected by electrodes 10 of the touch sensor.

In particular embodiments, the measured amount of charge or measured voltage of each capacitive node may be used to determine an offset resulting from the overall deformation of touch panel 20. As an example and not by way of limitation, a curve or 2D surface may be fit to the output signals from the entire touch sensor and the offset applied to the signals of the touch sensor may be determined from the curve or 2D surface. In particular embodiments, the offset resulting from deformation of touch panel 20 may be determined based at least in part on the a peak deviation or difference in the output signals of the touch sensor. As an example and not by way of limitation, the offset may be determined based at least in part on filtering of data using a pre-determined threshold value of the output signals. Furthermore, it may be inferred that signals below the pre-determined threshold is a result of deformation of touch panel 20 and not a result of a touch input.

As another example, determining the offset may be based at least in part on measured amounts of charge or measured voltages of the capacitive nodes with values below the pre-determined threshold level or on measured signals from capacitive nodes corresponding to a relative difference of measured signals from its neighboring capacitive nodes below a pre-determined threshold level. In particular embodiments, measured differences lower (in absolute value) than the pre-determined threshold value may be averaged to determine the offset, wherein the calculated value may represent a mean deformation gradient on a particular row or column, as appropriate. As described above, differences between adjacent nodes of the measured signal may be calculated by the following equation.

$$d_j = \text{err}(j) - \text{err}(j-1), j=1:N \quad (1)$$

where j is the index of the current capacitive node, $d_j$ is the difference between two adjacent capacitive nodes on a particular row or column, as appropriate, err is the measured signal corresponding to a particular capacitive node, and N is the number of capacitive nodes in the particular row or column. An average bend or deformation gradient may be approximated by the following equation:

$$\text{bend\_grad} = \frac{\sum_{j=1}^{N} d_j}{N} \quad (2)$$

where bend_grad is the average bend gradient or offset and may be calculated as an average of gradients lower (in absolute value) than the pre-determined threshold value. Although this disclosure illustrates and describes a particular compensation methodology for compensating for particular deformation of a touch-sensor stack, this disclosure contemplates any suitable compensation methodology for compensating any suitable deformation of a touch-sensor stack, such as for example, twisting or folding of the touch-sensor stack.

Figure 3:
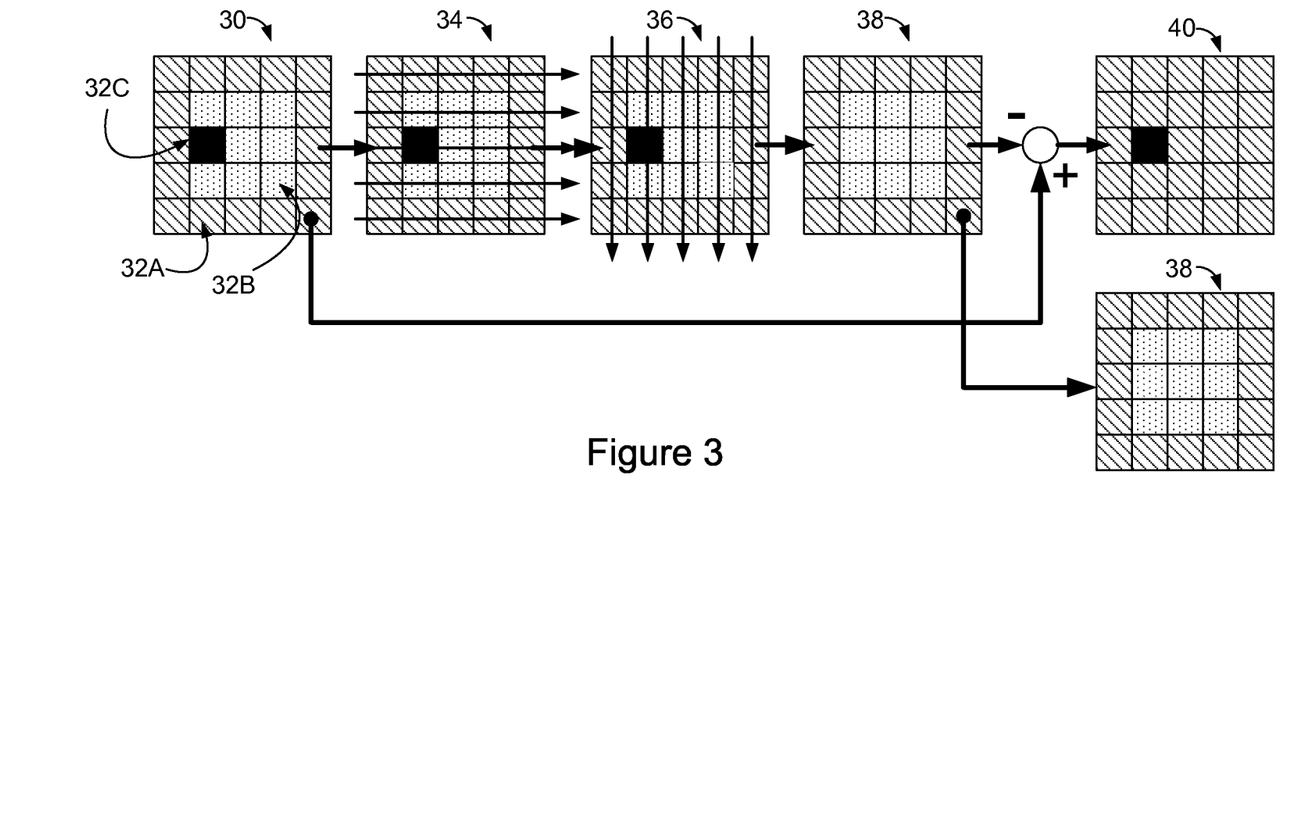
FIG. 3 illustrates an example implementation of an example deformation compensation algorithm.

FIG. 3 illustrates an example deformation compensation implementation. In particular embodiments, the offset, as described above, may be used to compensate for deformation of the touch panel for touch input detection. In particular embodiments, touch panel deformation compensation may substantially separate the measured signals from the touch sensor into a touch-based component 40 and a deformation-based component 38. As an example and not by way of limitation, the offset, determined as described above, may be applied to the output signals from the touch sensor prior to touch input processing. As another example, the offset may be transmitted to logic configured to process the signals from the touch sensor, as appropriate.

As described above, the offset resulting from touch panel deformation (e.g. as approximated by equation (2)) may be applied to the output signals from the capacitive nodes of the touch sensor. In particular embodiments, the offset resulting from touch panel deformation may be applied to the output signals through a 2D filter convolution operation. As an example and not by way of limitation, a kernel for a touch sensor with a M×N array of capacitive nodes 32A-C may be represented as a 2D coefficient matrix. In particular embodiments, the offset resulting from the touch panel deformation may be subtracted from output signals 30 of the touch sensor. As an example and not by way of limitation, the subtraction may be implemented as filtering of the output signals 30 of the touch sensor using the filtering coefficients or kernel determined based at least in part on the offset. Signals from a touch input may have a different spatial frequency than signals resulting from touch panel deformation. In the particular embodiments, capacitive nodes 32A-C of the touch sensor may be disposed in an array oriented along orthogonal axes. As an example and not by way of limitation, the filtering coefficients may have a directional dependency based at least in part a differing touch panel deformation directional radius and the filtering coefficients may be separately applied to output signals 30 along each dimension (e.g. along a X and Y axis) of the touch sensor.

In the example of FIG. 3, an example visual representation of a 2D matrix of data 30 from measured signals of the touch sensor as a function of a position within the touch sensor is illustrated. As an example and not by way of limitation, 2D matrix of measured signals 30 may include signals from one or more capacitive nodes with substantially no offset or gradient signal 32A, one or more capacitive nodes with an substantially small offset or gradient signal 32B due at least in part on touch panel deformation, one or more capacitive nodes with a with an substantially large offset or gradient signal 32C due at least in part on a touch input, or any combination thereof. In particular embodiments, measured signals 30 may be scaled prior to application of the offset. In particular embodiments, a bandwidth of measured signals 30 may be reduced and measured signals downsampled prior to application of the offset. In particular embodiments, the measured signals of capacitive nodes 32A-C along one or more edges may be corrected for uneven distribution of noise from the display of the touch sensor stack.

As described above, the kernel corresponding to the offset from touch panel deformation may applied to the 2D matrix of measured signals 30 of the touch sensor on a row-by-row basis as illustrated by 34. Furthermore, the kernel may be applied to the 2D matrix of data 30 of the touch sensor on a column-by-column basis as illustrated by 36. In particular embodiments, the compensation algorithm may use deformation-based component 38 calculated on the previous row or column, as appropriate, to improve bend calculation on the current row or column. As illustrated in the example of FIG. 3, processing of the output signals 34 and 36 may have a directional component. As an example and not by way of limitation, row-by-row processing 34 may include the effect of a touch input 32C that may not be present in column-by-column processing 36. In particular embodiments, the separate processing of the output signals 34 and 36 may be combined to determine deformation-based component 38. In particular embodiments, processed matrix 38 may be used to determine an amount of force associated with a touch or an amount of strength associated with LCD noise. In particular embodiments, mathematically subtracting processed matrix 38 from 2D matrix of measured signals 30 may yield touch-based component 40 for touch detection processing.

Figure 4:
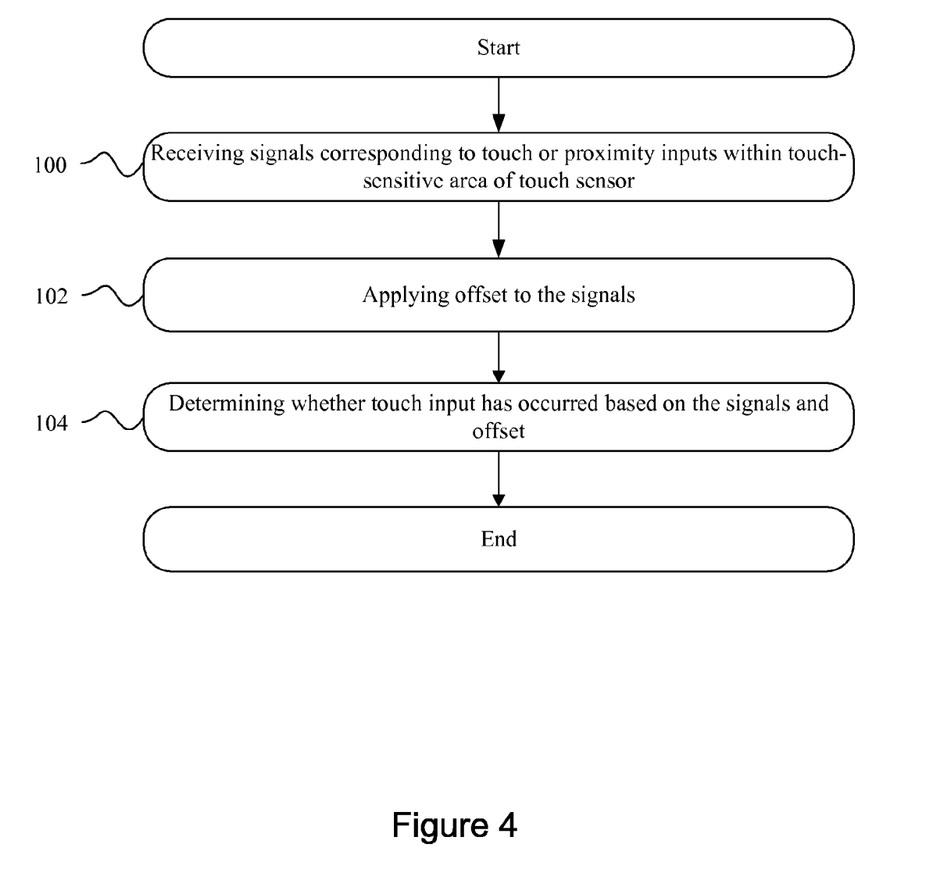
FIG. 4 illustrates an example method for touch panel deformation compensation.

FIG. 4 illustrates an example method for touch panel deformation compensation. The method may start at step 100, where one or more signals from a touch sensor of a device corresponding to touch or proximity inputs within a touch-sensitive area of the touch sensor are received. In particular embodiments, the touch sensor comprises one or more capacitive nodes. Step 102 applies an offset to one or more of the signals, the offset corresponding to a variation in a distance between a touch panel and a ground plane of the device. At step 104, whether a touch input to the touch sensor has occurred may be based at least in part on the signals and the offset as applied, at which point the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, from a touch sensor of a device, a plurality of signals from nodes of the touch sensor, wherein:
the plurality of signals comprises signals without a touch input and signals indicative of a touch or proximity input; and
the nodes of the touch sensor are formed by a two-dimensional matrix of rows and columns;
determining an offset based at least in part on:
a difference between the signals without the touch input of nodes on a row of nodes of the two-dimensional matrix relative to one or more neighboring nodes on the row of nodes of the two-dimensional matrix, and
a difference between the signals without the touch input of nodes on a column of nodes of the two-dimensional matrix relative to one or more neighboring nodes on the column of nodes of the two-dimensional matrix;
processing the two-dimensional matrix to generate a first processed two-dimensional matrix by applying the determined offset to the received plurality of signals on a row-by-row basis;
processing the two-dimensional matrix to generate a second processed two-dimensional matrix by applying the determined offset to the received plurality of signals on a column-by-column basis; and
determining a deformation-based component by combining the first processed two-dimensional matrix and the second processed two-dimensional matrix;
subtracting the combined processed two-dimensional matrix of the plurality of signals of the deformation-based component from the two-dimensional matrix of the received plurality of signals to yield a touch-based component; and
determining whether an actual touch input to the touch sensor has occurred based at least in part on the touch-based component.

2. The method of claim 1, wherein applying the offset comprises subtracting the offset from the signal of each node of the touch sensor.

3. The method of claim 1, wherein the offset is determined along orthogonal axes of the touch sensor.

4. The method of claim 3, wherein applying the offset comprises separately applying the offset to one or more of the plurality of signals received from the touch sensor along each orthogonal axis.

5. The method of claim 1, wherein the offset is further determined based at least in part on fitting a mathematical curvature function to the signals without the touch input or determining a maximum value in the signals without the touch input.

6. The method of claim 1, wherein the offset is determined at least in part on filtering one or more signals without the touch input higher than a pre-determined threshold value or removing the signals without the touch input of each node with a difference relative to one or more neighboring nodes higher than the pre-determined threshold value.

7. The method of claim 1, wherein the offset is stored as a two-dimensional kernel and each element of the kernel corresponds to a variation in a distance for each node, the distance being between the touch panel and the ground plane or display of the device.

8. The method of claim 7, wherein applying the offset comprises performing a convolution operation of the signal of each node with the kernel.

9. A computer-readable non-transitory storage medium embodying logic configured when executed to:
receive, from a touch sensor of a device, a plurality of signals from nodes of the touch sensor, wherein:
the plurality of signals comprises signals without a touch input and signals indicative of a touch or proximity input; and
the nodes of the touch sensor are formed by a two-dimensional matrix of rows and columns;
determine an offset based at least in part on:
a difference between the signals without the touch input of nodes on a row of nodes of the two-dimensional matrix relative to one or more neighboring nodes on the row of nodes of the two-dimensional matrix, and
a difference between the signals without the touch input of nodes on a column of nodes of the two-dimensional matrix relative to one or more neighboring nodes on the column of nodes of the two-dimensional matrix;
process the two-dimensional matrix to generate a first processed two-dimensional matrix by applying the determined offset to the received plurality of signals on a row-by-row basis;

process the two-dimensional matrix to generate a second processed two-dimensional matrix by applying the determined offset to the received plurality of signals on a column-by-column basis;

determine a deformation-based component by combining the first processed two-dimensional matrix and the second processed two-dimensional matrix;

subtract the combined processed two-dimensional matrix of the plurality of signals of the deformation-based component from the two-dimensional matrix of the received plurality of signals to yield a touch-based component; and determine whether an actual touch input to the touch sensor has occurred based at least in part on the touch-based component.

10. The medium of claim 9, wherein the logic is further configured to subtract the offset from the signal of each of the nodes of the touch sensor.

11. The medium of claim 9, wherein the offset is determined along orthogonal axes of the touch sensor.

12. The medium of claim 11, wherein the logic is further configured to separately apply the offset to one or more of the plurality of signals received from the touch sensor along each orthogonal axis.

13. The medium of claim 9, wherein the offset is further determined based at least in part on fitting a mathematical curvature function to the signals without the touch input or determining a maximum value in the signals without the touch input.

14. The medium of claim 9, wherein the offset is determined at least in part on filtering one or more signals without the touch input higher than a pre-determined threshold value or removing the signals without the touch input of each node with a difference relative to one or more neighboring nodes higher than the pre-determined threshold value.

15. The medium of claim 9, wherein the offset is stored as a two-dimensional kernel and each element of the kernel corresponds to a variation in a distance for each node, the distance being between the touch panel and the ground plane or display of the device.

16. The medium of claim 15, wherein applying the offset comprises performing a convolution operation of the signal of each node with the kernel.

17. A device comprising:
a measurement circuit; and
a computer-readable non-transitory storage medium coupled to the measurement circuit and embodying logic configured when executed to:

receive, from a touch sensor of a device, a plurality of signals from nodes of the touch sensor, wherein:
the plurality of signals comprises signals without a touch input and signals indicative of a touch or proximity input; and
the nodes of the touch sensor are formed by a two-dimensional matrix of rows and columns;

determine an offset based at least in part on:
a difference between the signals without the touch input of nodes on a row of nodes of the two-dimensional matrix relative to one or more neighboring nodes on the row of nodes of the two-dimensional matrix, and
a difference between the signals without the touch input of nodes on a column of nodes of the two-dimensional matrix relative to one or more neighboring nodes on the column of nodes of the two-dimensional matrix;

process the two-dimensional matrix to generate a first processed two-dimensional matrix by applying the determined offset to the received plurality of signals on a row-by-row basis;

process the two-dimensional matrix to generate a second processed two-dimensional matrix by applying the determined offset to the received plurality of signals on a column-by-column basis;

determine a deformation-based component by combining the first processed two-dimensional matrix and the second processed two-dimensional matrix;

subtract the combined processed two-dimensional matrix of the plurality of signals of the deformation-based component from the two-dimensional matrix of the received plurality of signals to yield a touch-based component; and determine whether an actual touch input to the touch sensor has occurred based at least in part on the touch-based component.

18. The device of claim 17, wherein the logic is further configured to subtract the offset from the signal of each of the nodes of the touch sensor.

19. The device of claim 18, wherein the offset is determined along orthogonal axes of the touch sensor.

20. The device of claim 18, wherein the logic is further configured to separately apply the offset to one or more of the plurality of signals received from the touch sensor along each orthogonal axis.

* * * * *